US006668586B2

(12) United States Patent
Lindenberg

(10) Patent No.: US 6,668,586 B2
(45) Date of Patent: Dec. 30, 2003

(54) METHOD FOR PRODUCING GLASS TILES, GLASS BORDERS, ORNAMENTAL PANELS MADE FROM GLASS OR THE LIKE

(76) Inventor: Josef Lindenberg, Roseneckstrasse 71, A-9210 Pörtschach (AT)

( * ) Notice: Subject to any disclaimer, the term of this patent is extended or adjusted under 35 U.S.C. 154(b) by 371 days.

(21) Appl. No.: 09/858,868

(22) Filed: May 17, 2001

(65) Prior Publication Data

US 2002/0012747 A1 Jan. 31, 2002

(30) Foreign Application Priority Data

May 18, 2000 (AT) .................................. 867/2000

(51) Int. Cl.$^7$ .................................................. C03B 23/02
(52) U.S. Cl. .................. 65/23; 65/26; 65/60.2; 65/60.5; 65/60.53; 65/60.8; 65/107
(58) Field of Search .................. 65/23, 26, 60.2, 65/60.5, 60.53, 60.8, 107; 264/221, 225

(56) References Cited

U.S. PATENT DOCUMENTS

| | | | |
|---|---|---|---|
| 1,368,958 A | 2/1921 | Miller ............................ 65/23 |
| 3,149,945 A | 9/1964 | Bertrand et al. ................. 65/23 |
| 3,360,351 A | 12/1967 | Murray et al. .................. 65/24 |
| 3,442,748 A | 5/1969 | D'Huart ....................... 428/143 |
| 3,928,515 A | 12/1975 | Richmond et al. .............. 264/5 |
| 4,222,759 A | 9/1980 | Kedda ........................... 65/23 |
| 4,286,981 A | 9/1981 | Clasen et al. ................. 65/169 |
| 4,326,872 A | 4/1982 | Miltenberger et al. ......... 65/112 |
| 4,822,397 A | 4/1989 | Crossley ...................... 65/107 |
| 4,828,596 A | 5/1989 | Reinherz ....................... 65/24 |
| 5,269,826 A | 12/1993 | Leroux et al. ............... 65/30.1 |
| 5,376,197 A | 12/1994 | Schaupert ................. 156/89.11 |
| 5,484,467 A | 1/1996 | Nass et al. ................... 65/33.4 |
| 6,101,846 A * | 8/2000 | Elledge ........................ 65/102 |
| 6,544,587 B1 * | 4/2003 | Setten et al. ................. 427/165 |

FOREIGN PATENT DOCUMENTS

| | | |
|---|---|---|
| AT | 304033 | 12/1972 |
| DE | 4226946 | 2/1994 |
| DE | 4408192 | 1/1995 |
| GB | 2271529 | 4/1994 |
| WO | 9937129 | 7/1999 |
| WO | 9958786 | 11/1999 |

* cited by examiner

Primary Examiner—Sean Vincent
(74) Attorney, Agent, or Firm—Dykema Gossett PLLC

(57) ABSTRACT

A method of producing glass tiles, glass borders, ornamental panels made from glass or the like, the rear side of which is structured to form a relief, involves the following steps:

trimming the glass slab to the desired size, applying an adhesive layer on predetermined regions forming a pattern or a motif on the rear side of the glass slab by means of a printing technique, depositing a powder coating that resists high temperatures on the rear side of the glass slab and removing the excess powder from the non-adhesive regions of the glass slab, positioning the glass slab with its coated rear side on a base that resists high temperatures and is provided with a parting agent, submitting the glass slab to a temperature treatment until plastic deformation is achieved, the glass slab sinking into the pattern or motif formed by the powder coating on account of its own weight, and removing the powder that resists high temperatures from the regions covered with the pattern or the motif once the glass slab has cooled down.

15 Claims, 1 Drawing Sheet

METHOD FOR PRODUCING GLASS TILES, GLASS BORDERS, ORNAMENTAL PANELS MADE FROM GLASS OR THE LIKE

BACKGROUND OF THE INVENTION

The invention relates to a method for producing glass tiles, glass borders, ornamental panels made from glass or the like, the rear side of which is structured to form a relief.

For some time past, glass tiles have been known for finishing walls and floors in buildings which permit to achieve interesting optical effects as compared to ceramic tiles.

DESCRIPTION OF PRIOR ART

AT 304.033 B for example discloses panes, slabs, tiles, tessera made of transparent glass or transparent synthetic material, the rear side of which is provided with a coating of natural or artificial fish silver. This permits to achieve novel optical and aesthetic effects when such slabs are used as tessera for example. Such tiles however are poorly suited for tiling with a conventional size of approximately 20×30 cm and for the processing steps such a tiling procedure requires (trimming and making recesses and bores, respectively), since most of the time tilers are not equipped with the tools and do not dispose of the know-how of those skilled in the art of glass working.

The case is quite similar with a glass tile known from GB 2,271,529 A which is printed on its rear, a previously manufactured cover plate of the size of the tile being glued onto the rear side. The cover plate is produced in a casting mold and consists among others of magnesium oxide, magnesium chloride, cement, fine sand and water, which mixture is left to harden in the casting mold. Such a glass tile has a multilayered, inhomogeneous structure which forbids conventional processing as it is known with ceramic tiles.

In this connection, WO 99/58786 discloses a method of producing a glass tile whereby the glass tile is at first trimmed to the desired shape, cleaned and submitted to a heat treatment until it softens. After the glass tile has cooled down to a temperature in the range of room temperature, a mineral lacquer coating is applied to one side of the tile and the lacquer coating is baked at a temperature below the maximum temperature of the preceding heat treatment. Subject to the kind of glass utilized, heat treatment is performed at maximum temperatures ranging from 750° C. to 850° C. and the subsequent firing of the lacquer coating at a temperature of about 560° C. to about 660° C. In submitting the glass tile to heat treatment, a structural transformation is achieved that makes it possible to break the glass in a controlled way in the course of the processing steps of tiling. During heat treatment, the tile is laid on a bed of molding sand, wherein its rear side may be given a structure. A pattern may thereby be pressed into the bed of molding sand, a bed of pulverized asbestos for example, by means of a stamp or a roller. The disadvantage of such a method is that only quite coarse structures may be realized which can relatively easily be altered or destroyed when the glass slab or tile is applied.

DE 42 26 946 A1 discloses a method of producing ornamented glass ceramic products and glass ceramic products manufactured according to this method, whereby the ornament is completely or partially embedded in the surface of the glass ceramics. The surface of the backing glass that is to be decorated is thereby brought to serve as an anode within the range of its temperature of transformation by causing a current to flow that occasions an alteration of the surface of the basic glass up to a desired depth which depends on the duration of the flow of current. For this purpose, it is necessary to have the surface of the basic glass slab provided with a continuous, conductive layer of gold, of approximately 200 nm thick, which must be removed prior to depositing the ceramic ornament. After this pretreatment has been performed, the ornament is sunken into the surface of the basic glass slab to precisely that extent in which the individual ornament points no longer protrude from the surface of the glass slab but form a closed plane surface unit.

DE 44 08 192 A1 also discloses a method of producing ornamented glass ceramics—or glass products whereby a substance basing on screen-printing oil is applied to those locations on the substrate that will later correspond to the ornament. At temperatures >600° C., the screen-printing oil reacts with the substrate to form a removable reaction product. After the reaction product has been removed, a decorative color may be filled into the formed cavities and be baked at an appropriate temperature.

Furthermore, WO 99/37129 A2 shows a method of producing a composite material, whereby a basic element and a transparent cover element are combined by enclosing a material that is not completely transparent (embedding material) and by using an adhesive. The embedding material thereby is a powder that contains natural and/or artificial color pigments, whereby the powder is mixed with the adhesive and the basic element and the cover element are joined by means of the adhesive mixed with the powder. On account of the inhomogeneous structure of the composite material, disadvantages arise that are analogous to those of the already mentioned glass tile according to GB 2,271,529 A.

SUMMARY OF THE INVENTION

In view of the method of producing glass tiles with a structured rear side as it has been described herein above, it is the object of the present invention to suggest a method whereby patterns and motifs of a fine structure may also be readily realized. It is another object of the present invention to fashion such glass tiles in color without much additional work.

According to the invention, the solution to this object consists of the following steps:

trimming the glass slab to the desired size, applying an adhesive layer on predetermined regions forming a pattern or a motif on the rear side of the glass slab by means of a printing technique, depositing a powder coating that resists high temperatures on the rear side of the glass slab and removing the excess powder from the non-adhesive regions of the glass slab, positioning the glass slab with its coated rear side on a base that resists high temperatures and is provided with a parting agent, submitting the glass slab to a temperature treatment until plastic deformation is achieved, the glass slab sinking into the pattern or motif formed by the powder coating on account of its own weight, and removing the powder that resists high temperatures from the regions covered with the pattern or the motif once the glass slab has cooled down.

Thanks to the adhesive layer applied by printing, discretional patterns or motifs may be given, in which regions the high-temperature resistant powder that acts as molding sand adheres. For the purpose of obtaining greater structural depth for the pattern or the motif, several layers of adhesive and powder may be applied successively.

In a particularly advantageous development of the invention there is provided that at least one mineral colored layer is applied to predetermined regions of the rear side of the glass slab prior to applying the layer of adhesive and the layer of powder. Glass tiles backed with colored motifs that are additionally provided with a relief-like structure may thus be manufactured in one operating sequence at low cost and with ease of high-yield manufacturing. In submitting the glass slab to a temperature treatment until plastic deformation is reached, a rounding off of the corners and edges of the glass slabs is furthermore performed in the same operating sequence for ease of gripping, whereby temperature treatment may be controlled in such a way that high dimensional accuracy and evenness of the tiles or of the glass borders is achieved.

Another advantage has to be stressed which consists in that no hard fusion casting or casting molds are needed to produce the relief-like structures so that no problems such as for example differing expansibility of the fusion casting mold and of the glass tile can arise from shaping.

According to the invention, the colored layer and the adhesive layer as well may be applied by means of screen-printing, dabber-printing or offset-printing techniques. The colored regions and the structured regions may overlap in parts or entirely, but it is also possible to only apply color to the plane regions and to leave the structured regions uncolored. For the purpose of achieving further effects, colored glass may also be used, or the surface of the glass may be roughened or etched. The glass slabs are preferably submitted to a temperature treatment at temperatures ranging from 780° C. to 810° C.

The high-temperature resistant powder preferably used is a powder of aluminum oxide or aluminum silicate which is applied to the rear side of the glass slab by means of a dusting device. After the powder of aluminum oxide or aluminum silicate has been applied, excesses are removed from the non-adhesive regions of the glass slab, preferably by means of an air jet.

It proved particularly advantageous to employ for the mineral color layer a mixture of glass frits, color pigments and oils, which are baked in one operational sequence.

Another advantage to be mentioned is that the discrete procedure steps can be performed in an automatized manner in a tunnel kiln.

In a development of the invention there is provided that high-temperature resistant particles, preferably corundum particles, are glued onto the visual side of the glass slab opposite the relief-like structured rear side thereof by using a screen-printing, dabber-printing or offset-printing technique and are partially melt down while the glass slab is submitted to temperature treatment. This measure allows the surface of the tile not to be slippery at all and to be highly resistant to abrasion, whereby the particles may be applied according to a pattern or over the entire surface thereof. The particles of preference thereby are corundum particles of a grain size of 0.1 to 3 mm. Such glass tiles may also be used for floors in private and public areas and for stairs as well.

BRIEF DESCRIPTION OF THE DRAWINGS

Herein after, the method according to the invention is explained in more detail with the help of schematic drawings.

DETAILED DESCRIPTION OF THE PREFERRED EMBODIMENTS

Figure 1:
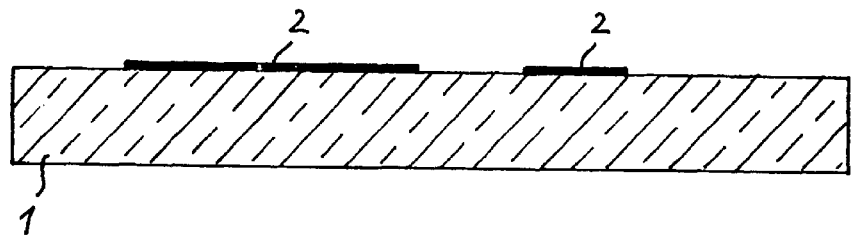
FIGS. 1 through 4 show various stages of the manufacturing process according to the invention for a glass tile in a sectional view. For the sake of clarity, individual layers are shown distorted in height (not to scale).

Upon trimming a glass slab 1 (Float or Optiwhite glass slabs), said trimming being performed with dimensional accuracy and in a square manner, said slabs are washed, dried and printed with one or several colored layers 2 by way of screen-printing (see FIG. 1).

Figure 2:
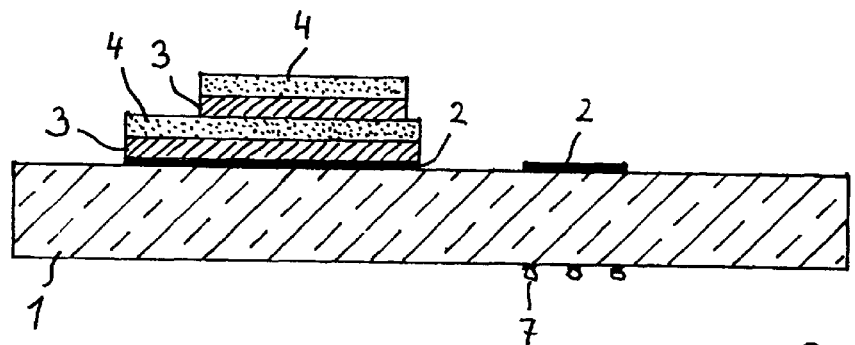

After the colors are dry, an adhesive layer 3 is applied by means of screen-printing to those regions of the glass slab that have been selected for the pattern or the motif. In the next stage, a high-temperature resistant layer of powder 4 is applied by means of a metering dusting plant and is removed from the non-adhesive places by being blown off. As shown in FIG. 2, this application may be repeated several times in order to achieve the desired depth of the relief.

After the coating of color and aluminum oxide has dried out, the glass slab is laid onto a high-temperature resistant base 5, a slab made from ceramic fiber, e.g. that has been provided with a parting agent, the coated side of the slab showing downward, and is submitted to a temperature treatment ranging from 780° C. to 810° C. depending on the composition of the colored layer. The organic substances of the colored and adhesive layers volatilize in the process, the applied high-temperature resistant layer of powder continuing to resist the temperature and the glass slab 1 sinking into the pattern or motif formed by the layer(s) of powder 4 on account of its own weight. This condition is represented in FIG. 3, and it may be noticed that in the same operational sequence the edges 6 of the glass slab 1 are rounded by temperature treatment for ease of gripping.

Figure 4:
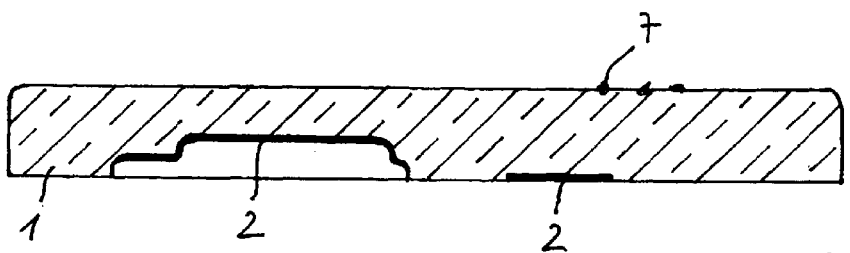

After the glass slab 1 has cooled down, the aluminum oxide powder is brushed off to obtain the finished product illustrated in FIG. 4. The colored layer 2 which is fused with the glass tile and the desired relief in the glass tile may thus be produced at low cost in one operational sequence.

Figure 3:
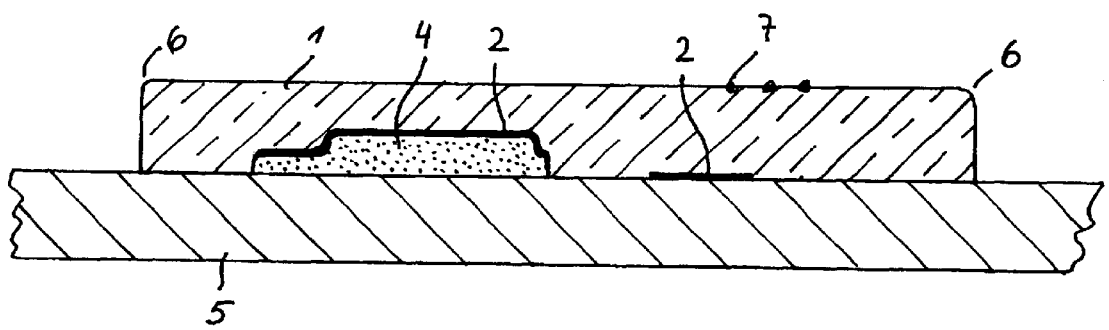

As represented in the FIGS. 2 through 4, it is also possible to glue corundum particles 7 onto the visual side of the glass plate 1, said particles partially melting down during temperature treatment of the glass plate 1, thus rendering the glass tile non slippery at all and resistant to abrasion.

What is claimed is:

1. Method for producing glass tiles, glass borders, ornamental panels made from glass or the like, the rear side of which is structured to form a relief, comprising:

trimming a glass slab to a desired size, applying an adhesive layer on predetermined regions forming a pattern or a motif on the rear side of said glass slab by means of a printing technique, depositing a powder coating that resists high temperatures on the rear side of said glass slab and removing excess powder from non-adhesive regions of said glass slab, positioning said glass slab with its coated rear side on a base that resists high temperatures and is provided with a parting agent, submitting said glass slab to a temperature treatment until plastic deformation is achieved, said glass slab sinking into said pattern or motif formed by said powder coating on account of its own weight, and removing said high temperature resisting powder from said regions covered with said pattern or said motif once said glass slab has cooled down.

2. Method according to claim 1, wherein at least one mineral colored layer is applied to predetermined regions of the rear side of said glass slab prior to applying said adhesive layer and said powder coating.

3. Method according to claim 2, wherein a screen-printing, a dabber-printing or an offset-printing technique is used for applying said colored layer.

4. Method according to claim 1, wherein a screen-printing, a dabber-printing or an offset-printing technique is used for applying said adhesive layer.

5. Method according to claim 1, wherein several of said adhesive layers and several of said powder layers are successively applied for the purpose of obtaining greater structural depth of said pattern or said motif.

6. Method according to claim 1, wherein said glass slab is submitted to a temperature treatment at temperatures ranging from 780° C. to 810° C.

7. Method according to claim 1, wherein said high-temperature resistant powder used is a powder of aluminum oxide which is applied to the rear side of said glass slab by means of a dusting device.

8. Method according to claim 1, wherein said high-temperature resistant powder used is a powder of aluminum silicate which is applied to the rear side of said glass slab by means of a dusting device.

9. Method according to claim 1, wherein said excess powder consisting of aluminum oxide is removed by way of an air jet.

10. Method according to claim 1, wherein said excess powder consisting of aluminum silicate is removed by way of an air jet.

11. Method according to claim 2, wherein a mixture of glass frits, color pigments and oils is utilized for said mineral color layer.

12. Method according to claim 1, wherein all discrete procedure steps are performed in an automatized manner in a tunnel kiln.

13. Method according to claim 1, wherein high-temperature resistant particles, preferably corundum particles, are glued onto the visual side of said glass slab opposite said relief-like structured rear side thereof by using a screen-printing, dabber-printing or offset-printing technique and are partially melt down while said glass slab is submitted to temperature treatment.

14. Method according to claim 13, wherein said high-temperature resistant particles are corundum particles.

15. Method according to claim 14, wherein said corundum particles used have a grain size of 0.1 to 3 mm.

* * * * *